US010274319B2

(12) United States Patent
Wang

(10) Patent No.: US 10,274,319 B2
(45) Date of Patent: Apr. 30, 2019

(54) PHOTONIC INTEGRATED CIRCUIT FOR AN INTERFERENCE FIBER OPTIC GYROSCOPE (IFOG)

(71) Applicant: KVH Industries, Inc., Middletown, RI (US)

(72) Inventor: Liming Wang, Tinley Park, IL (US)

(73) Assignee: KVH Industries, Inc., Middletown, RI (US)

( * ) Notice: Subject to any disclaimer, the term of this patent is extended or adjusted under 35 U.S.C. 154(b) by 0 days.

(21) Appl. No.: 15/914,061

(22) Filed: Mar. 7, 2018

(65) Prior Publication Data

US 2018/0259337 A1  Sep. 13, 2018

Related U.S. Application Data

(60) Provisional application No. 62/469,447, filed on Mar. 9, 2017.

(51) Int. Cl.
*G01C 19/72* (2006.01)
*G02B 6/42* (2006.01)

(52) U.S. Cl.
CPC .......... *G01C 19/721* (2013.01); *G01C 19/725* (2013.01); *G01C 19/726* (2013.01); *G02B 6/4216* (2013.01)

(58) Field of Classification Search
CPC .... G01C 19/72; G01C 19/721; G01C 19/725; G01C 19/726
See application file for complete search history.

(56) References Cited

U.S. PATENT DOCUMENTS 5,037,205 A  8/1991  Pavlath
5,194,917 A  3/1993  Regener
(Continued)

FOREIGN PATENT DOCUMENTS

EP  1025422 A1  8/2000
EP  2096408 A2  4/2008
EP  2246663 A2  11/2010

OTHER PUBLICATIONS

International Search Report and Written Opinion for PCT/US2018/021262 dated Jun. 15, 2018 entitled "Photonic Integrated Circuit for an Interference Fiber Optic Gyroscope (IFOG)".

(Continued)

*Primary Examiner* — Jonathan M Hansen
(74) *Attorney, Agent, or Firm* — Hamilton, Brook, Smith & Reynolds, P.C.

(57) ABSTRACT

The described embodiments relate to a photonic integrated circuit (PIC) for use in a fiber optic gyroscope (FOG). Some embodiments describe a PIC with connectors for coupling to external components such as a light source, a photodetector and a fiber coil, with beamsplitting devices (e.g., couplers), waveguide and other photonic components integrated on the PIC. Some embodiments describe a hybrid PIC (HPIC) with the PIC, light source and photodetector attached to a common submount, and with connectors for coupling to a fiber coil. Other embodiments describe an extended PIC (EPIC) that integrates the PIC components, the light source, the photodetector, and other components (e.g., a wavemeter) on a common substrate. The described embodiments may also include a detection/feedback circuit that provides control signals and other parameters to the PIC, HPIC, or EPIC, and receives output signals from the PIC, HPIC, or EPIC.

27 Claims, 6 Drawing Sheets
(1 of 6 Drawing Sheet(s) Filed in Color)

(56) References Cited

U.S. PATENT DOCUMENTS

| | | | |
|---|---|---|---|
| 5,223,911 A | 6/1993 | Suchoski | |
| 6,163,632 A | 12/2000 | Rickman | |
| 6,445,455 B1* | 9/2002 | Hall | G01C 19/726 9/726 |
| 7,085,441 B1 | 8/2006 | Kozlov | |
| 2007/0229838 A1 | 10/2007 | Greening | |
| 2008/0024786 A1* | 1/2008 | Sanders | G01C 19/722 9/722 |
| 2008/0291459 A1 | 11/2008 | Meyer | |

OTHER PUBLICATIONS

Lallier, E., et al., "Laser Oscillation of Single-Mode Channel Waveguide in ND:MGO:LINB03", Electronic Letters, IEEE Stevenage, GB, vol. 26, No. 22, Oct. 26, 1989.

Srinivasan, S., et al., "Design of integrated hybrid silicon waveguide optical gyroscope", Optics Express 24988, vol. 22, No. 21, Oct. 20, 2014.

Tran, M., et al., "Integrated optical driver for interferometric optical gyroscopes", Optics Express 3827, vol. 25, No. 4, Feb. 20, 2017.

* cited by examiner

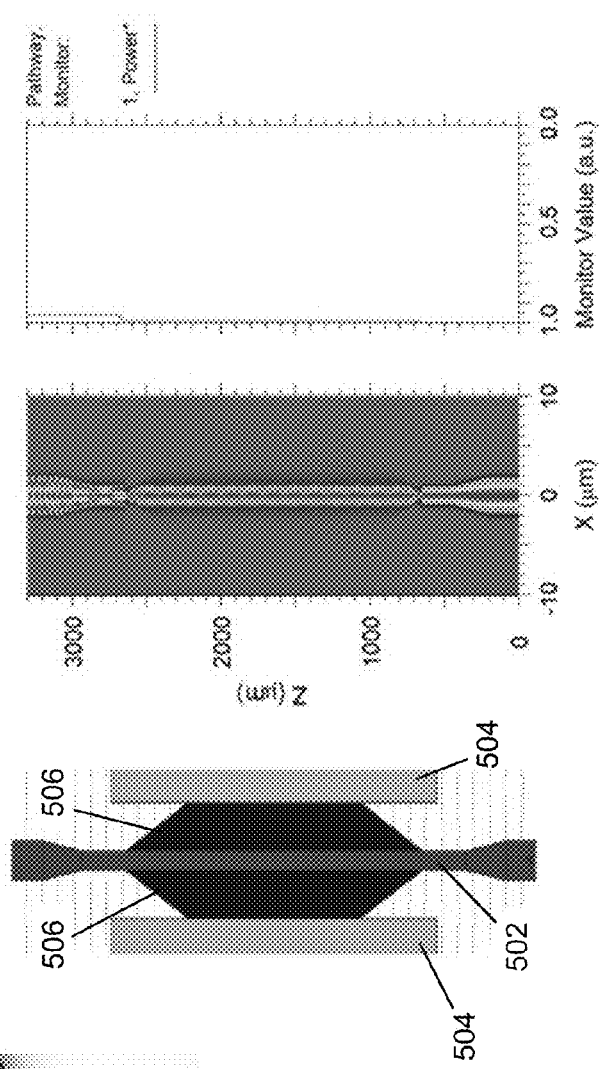
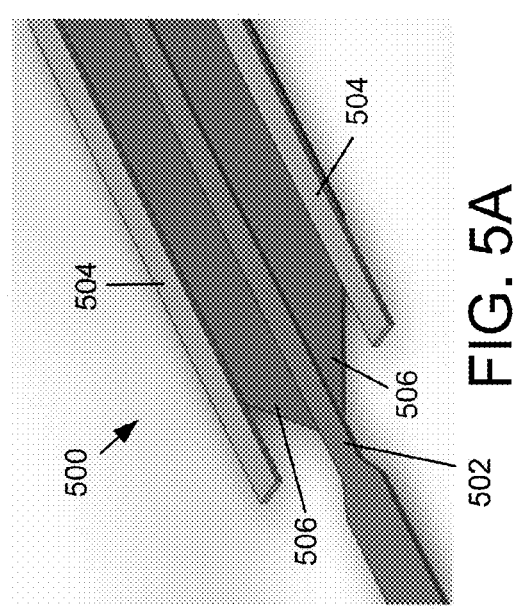
FIG. 5A
FIG. 5B
FIG. 5C

PHOTONIC INTEGRATED CIRCUIT FOR AN INTERFERENCE FIBER OPTIC GYROSCOPE (IFOG)

RELATED APPLICATION

This application claims the benefit of U.S. Provisional Application No. 62/469,447, filed on Mar. 9, 2017. The entire teachings of the above application(s) are incorporated herein by reference.

BACKGROUND

Fiber optic gyroscopes (FOGs) have certain advantages over mechanically-based gyroscopes, such as solid-state operation (no moving parts), lighter weight, smaller size, lower power, more rapid turn-on time, and higher reliability. Consequently, FOGs have been proposed for rotation sensing in a wide range of application areas. Interest has been directed at a number of application areas, such as attitude and heading reference systems (AHRS) for use in inertial measurement units (IMU), land-based navigation, and well logging for use in the oil and gas exploration industry. Emphasis is clearly being directed toward the development of closed loop systems with scale factor stabilities of about 100 ppm or better. Open loop technology, however, may still find use in applications where moderate scale factor stabilities are sufficient. One area being explored in land navigation is the development of low cost low-medium accuracy devices for automobile guidance and tracking systems with bias drift of about 0.3°/hour or less, and the scale factor of about 1000 ppm or better, which is the level currently being attained by both closed loop and open loop gyroscope systems.

FOGs, accelerometers and FOG-based inertial navigation systems (INS) form key parts of the integrated sensor systems essential for highly accurate autonomous car performance. For localization, the vehicles can use a combination of the Global Positioning System (GPS) and inertial navigation systems (INS). The accuracy of GPS systems has improved significantly since 2000. However, GPS error can still be large—several meters, even under ideal conditions. The errors grow rapidly when obstacles or terrain occlude the sky, preventing GPS receivers from obtaining signals from a sufficient number of satellites. This is a significant concern in urban areas, where skyscrapers create "urban canyons" in which GPS availability is severely limited. GPS is typically coupled with an INS, which consist of components such as odometers, compasses, gyroscopes, and accelerometers, to continuously calculate position, orientation, and velocity of a vehicle without need for external references. INS are used to improve the accuracy of GPS and to fill in "gaps" such as those caused by urban canyons.

SUMMARY

The described embodiments relate to a photonic integrated circuit (PIC) for use in a fiber optic gyroscope (FOG). Some embodiments describe a PIC with connectors for coupling to external components such as a light source, a photodetector and a fiber coil, with beamsplitting devices (e.g., couplers), waveguide and other photonic components integrated on the PIC. Some embodiments describe a hybrid PIC (HPIC) with the PIC, light source and photodetector attached to a common submount, and with connectors for coupling to a fiber coil. Other embodiments describe an extended PIC (EPIC) that integrates the PIC components, the light source, the photodetector and other components (e.g., a wavemeter) on a common substrate. The described embodiments may facilitate lower manufacture cost and mass-production of a stable FOG, fabricated on a substrate (a silicon substrate, for example, or non-silicon substrate suitable for operating at shorter wavelengths), using materials and processes compatible with the fabrication of microelectronic circuits. The integration of several FOG subcomponents into one optical circuit may increase performance reliability of the FOG, while increasing production efficiency of the FOG. Further, the resulting compactness of the described embodiments facilitates an ability to operate across a wide range of temperature and humidity conditions, thereby increasing the utility and performance reliability of the FOG.

In an interferometric fiber-optic gyroscope (IFOG), light from an optical source is divided into two beams. In the example embodiments described herein, a coupler is used to divide input light into two output beams (and also to combine two input beams into a single output beam), although other devices known in the art (also known as beamsplitters) may be used perform the same dividing and/or combining operation.

The two light beams divided by the coupler are inserted into a fiber loop of multi-turns to form clockwise (CW) and counterclockwise (CCW) propagating optical fields. After passing through the fiber loop, the two light beams are recombined by the coupler and the interference between them is detected at the output, as shown in FIG. 1. In a rotating frame of reference, a phenomenon known as the "Sagnac effect" causes the effective optical path through the loop to increase for one beam, and to decrease for the other beam. The resultant phase shift between the two optical components at the output is given by:

$$\phi_s = \frac{2\pi RL}{\lambda_0 c} \Omega \quad (1)$$

where, R is the radius of the fiber coil, L is the total length of fiber in the loop, $\lambda_0$ is the vacuum wavelength of the source radiation, c is the velocity of light, and $\Omega$ is the rotation rate. The phase where $\phi_s$ is known as the Sagnac phase shift. To achieve a high degree of accuracy, the two paths experienced by the two optical beams must be identical when the gyroscope is in a non-rotating frame, that is, the system must exhibit reciprocity.

The so-called "minimum configuration" of the IFOG optical system 100 is arranged to achieve this reciprocity, as shown in FIG. 1. Here, the output is derived from the same port 102 that is used as the input on the second coupler 104, and a phase modulator 106 is used at the input to the fiber loop 108. Requirements for reciprocity in the fiber loop 108 is satisfied when the system is at single spatial mode, single polarization mode operation. The output S of the Sagnac interferometer is a cosine interference function of the form:

$$S = 1 + \cos(\phi_{nr} + \phi_s) \quad (2)$$

where $\phi_{nr}$ is a nonreciprocal phase shift, and $\phi_s$ is the rotation-induced Sagnac phase. For a reciprocal system, $\phi_{nr}=0$ and the sensitivity to Sagnac shift (i.e., $\delta S/\delta \phi_s$)=0, whereas if $\phi_{nr}=\pi/2$, the sensitivity is maximized.

A commonly used approach to introduce a nonreciprocal phase shift is known as dynamic phase biasing, where a time varying modulation $\phi_{nr}=\phi_{nr}(t)$ is applied via a phase modulator 110 located at one end of the fiber loop 108. With the IFOG optical system 100 in stationary frame, the time varying nonreciprocal phase bias modulates the interferometer output symmetrically over the cosine interferometer transfer function described by Eq. (2).

In a rotating frame, however, the Sagnac phase shift introduces an offset that causes an asymmetric output modulation. In an example embodiment, where $\phi_{nr}=\phi_m \sin \omega_m t$, the output signal at the fundamental of the modulation frequency may be given by:

$$S(\omega_m)=J_1(\phi_m)\sin(\phi_s) \quad (3)$$

where $J_1$ is the first order of the Bessel function of the first kind.

There are two types of basic operation of the IFOG: open-loop and closed-loop. FIGS. 1 and 2 show schematically the basic configurations used to implement the two types of operation. For open loop operation, an example of which is shown in FIG. 1, the magnitude of Sagnac phase shift is determined directly by measurement of the output signal $S(\omega_m)$. For closed loop operation, an example of which is shown in FIG. 2, the output signal $S(\omega_m)$ is nulled by feedback 202 to the fiber coil 108 using phase modulators 204 to introduce a nonreciprocal phase to counter-balance the Sagnac shift.

Two IFOG architectures described herein include (i) an all-fiber architecture, and (ii) a hybrid architecture based on nonlinear optic crystal.

All-Fiber Architecture—

The all-fiber architecture provides a very good signal-to-noise ratio due to the high returning power because the optic system of the minimum configuration can be made to have low optic loss. The device can be manufactured at low cost because the individual optic components can be made with relatively inexpensive apparatus and processes, and the assembling of the optic system is not particularly labor intensive. The all-fiber architecture makes use of a "coil" coupler to split and recombine the interfering waves and a "source" coupler to send the signal coming back through the common input-output port onto a detector. The polarization is filtered at this reciprocal port with an all-fiber polarizer, which can be a "coiled" fiber polarizer, a side-polished fiber with birefringent crystal overlay, or a metal coated D-shape fiber with its evanescent wave tail exposed.

The main limitation of the all-fiber architecture is the phase modulator. The only practical technique is to wind a fiber around a piezoelectric tube or disk, which modifies the fiber length by controlling the disk diameter with a driving voltage. This method is perfectly adequate for the biasing modulation-demodulation, but piezoelectric modulators experience narrow mechanical resolutions, so obtaining an accurate scale factor requires the use of more sophisticated signal processing techniques. An all-fiber architecture yields very good bias performance, but its scale factor accuracy is limited in practice to about 500 ppm. By far the highest scale factor performances are obtained with phase-ramp close-loop technique, which require a broad modulation band.

Hybrid Architecture—

Integrated optics based on the nonlinear optic crystals, particularly on a lithium niobite substrate, was recognized early on as a very promising technology for the fiber-optic gyroscope. A multifunction optic integrated circuit has been applied to implement the key functions of device operation. A simple all-guided architecture can be implemented with a sensing fiber coil and an optic receiver connected to an integrated optic circuit. The decisive advantage of integrated optics over all-fiber approach, however, is a phase modulator with a flat response over a large bandwidth, which permits the use of efficient signal-processing techniques that yield small scale factor error over the whole potential dynamic range of the IFOG. This technology further provides the useful advantage of facilitating the integration of several other functions onto a single substrate, which improves the compactness and reduces the external connections.

A high degree of integration with this type of nonlinear optic crystal (e.g., lithium niobite) presents challenges to IFOG performance. For example, the use of two Y-junction transmission paths, connected by their base branch, has been proposed and studied. However, this "double-Y" configuration resulted in a poor IFOG performance because of the limited rejection of the common base waveguide that acts as the spatial filter to ensure optic reciprocity. This limitation on optic reciprocity is partially due to the crystalline nature of the lithium niobate substrate. The in-plane birefringence of the lithium niobate substrate restricts the degree of freedom of the optic circuit layout to one dimension, so the two Y-junctions must be placed in a straight line. No curvature on the connecting base waveguide is allowed due to the optic anisotropic material. Furthermore, the early prototypes did not incorporate any isolator, absorber and filter to eliminate the antisymmetrical mode radiated from the junction.

In one aspect, the invention may be a photonic integrated circuit (PIC) for use in a fiber optic gyroscope (FOG). The PIC may comprise a first connector configured to be connected to a light source, a second connector configured to be connected to a photodetector, a third connector configured to be connected to a first port of a fiber coil, and a fourth connector configured to be connected to a second port of the fiber coil. The PIC may further comprise a first coupler having a first branch port, a second branch port and a common base port, a waveguide polarizer having a first polarizer port and a second polarizer port, and a second coupler having a first branch port, a second branch port and a common base port.

The first branch port of the first coupler may be coupled to the first connector through a first waveguide, the second branch port of the first coupler may be coupled to the second connector through a second waveguide, and the common base port of the first coupler may be coupled to the first polarizer port through a third waveguide. The first branch port of the second coupler may be coupled to the third connector through a fourth waveguide, the second branch port of the second coupler may be connected to the fourth connector through a fifth waveguide, and the common base port of the second coupler may be coupled to the second polarizer port through a sixth waveguide. At least one of an isolator, an absorber, a filter and a deflector, may be disposed proximate to the one or more of the fifth waveguide, the polarizer, and the sixth waveguide. The first through sixth waveguides may be optic waveguides configured to be single-mode and polarization-maintaining. At least the first and second couplers and the polarizer may be integrated on a common substrate. The PIC components, formed on a common substrate as described herein, may facilitate efficient use of physical space and enhanced transmission and coupling characteristics.

The PIC may further comprise a light source coupled to the first connector, a photodetector coupled to the second connector, a fiber coil having a first fiber coil port coupled to the third connector and a second fiber coil port coupled to the fourth connector, and a phase modulator associated with the fiber coil. The phase modulator may be configured to modulate, based on a modulating signal, light that propagates through the fiber coil. The PIC, light source, photodetector, fiber coil and modulator, when configured as described, may form an optic system for use in a FOG.

The PIC may further comprise a detection/feedback circuit. The detection/feedback circuit may comprise a local oscillator configured to provide a reference signal from which the modulating signal is derived, and a phase sensing detector configured to receive an output from the photodetector and produce a rotation measurement signal therefrom. The PIC, light source, photodetector, fiber coil, modulator, detection/feedback circuit and phase sensing detector, when configured as described, may form a FOG.

The first through sixth waveguides may be configured to support only a single spatial mode. The first through sixth waveguides may be configured to be birefringent. The first through sixth waveguides may be configured to support only a single linear polarization mode. The first through sixth waveguides may comprise nitride on glass, although other technologies may also be used.

The light source may be a broadband, semiconductor-based light source. The PIC may further comprise an inline optic isolator disposed in the first waveguide, between the first connector and the first coupler.

In another aspect, the invention may be an extended photonic integrated circuit (EPIC) for use in a fiber optic gyroscope (FOG). The EPIC may comprise a light source, a photodetector, a first connector configured to be connected to a first port of a fiber coil, and a second connector configured to be connected to a second port of the fiber coil. The EPIC may further comprise a first coupler having a first branch port, a second branch port and a common base port, a waveguide polarizer having a first polarizer port and a second polarizer port, and a second coupler having a first branch port, a second branch port and a common base port. At least the light source, photodetector, first and second couplers and polarizer may be integrated on a common substrate. The EPIC components, formed on a common substrate, as described herein, may facilitate efficient use of physical space and enhanced transmission and coupling characteristics.

The first branch port of the first coupler may be coupled to the light source through a first waveguide, the second branch port of the first coupler may be coupled to the photodetector through a second waveguide, and the common base port of the first coupler may be coupled to the first polarizer port through a third waveguide. The first branch port of the second coupler may be coupled to the first connector through a fourth waveguide, the second branch port of the second coupler may be connected to the second connector through a fifth waveguide, and the common base port of the second coupler may be coupled to the second polarizer port through a sixth waveguide. The EPIC may further comprise at least one of an isolator, an absorber, a filter and a deflector, disposed proximate to the fifth waveguide, the polarizer, and the sixth waveguide. The EPIC may further comprise an optic wavemeter that uses at least a portion of an optical signal that is (i) derived from the light source and (ii) returned from the fiber coil, and produces a signal that represents an effective interferometric wavelength of the optical signal. The first through sixth waveguides may be configured to be single-mode and polarization-maintaining. The EPIC components, formed on a common substrate, may facilitate efficient use of physical space and enhanced transmission and coupling characteristics.

The EPIC may further comprise a fiber coil having a first fiber coil port coupled to the first connector and a second fiber coil port coupled to the second connector, and a phase modulator associated with the fiber coil. The phase modulator may be configured to modulate, based on a modulating signal, light that propagates through the fiber coil. The EPIC, fiber coil and modulator, when configured as described, may form an optic system for use in a FOG.

The EPIC may further comprise a detection/feedback circuit module. The detection/feedback circuit module may comprise a local oscillator configured to provide a reference signal from which the modulating signal is derived, a phase sensing detector configured to receive an output from the photodetector and produce a rotation measurement signal therefrom, and a scale factor correction mechanism that corrects a FOG scale factor based on the effective interferometric wavelength of the optical signal. The EPIC, fiber coil, modulator, and detection/feedback circuit module, when configured as described, may form a FOG.

The first through sixth waveguides may be configured to support only a single spatial mode. The first through sixth waveguides may be configured to be birefringent. The first through sixth waveguides may be configured to support only a single linear polarization mode. The first through sixth waveguides may comprise nitride on glass, although other technologies may also be used.

The phase sensing detector may remove a modulation frequency component from the output of the photodetector to produce the rotation measurement signal. The light source may be a broadband, semiconductor-based light source. The EPIC may further comprise an inline optic isolator disposed in the first waveguide, between the light source and the first coupler.

In another aspect, the invention may be a hybrid photonic integrated circuit (HPIC) for use in a fiber optic gyroscope (FOG). The HPIC may comprise a submount, a semiconductor-based light source fixedly attached to the submount, a photodetector fixedly attached to the submount, a first connector fixedly attached to the submount, and a second connector fixedly attached to the submount. The first and second connectors may be configured to be connected to first and second ports, respectively, of the fiber coil. The HPIC may further comprise a photonic integrated circuit, fixedly attached to the submount. The photonic integrated circuit may comprise a first coupler having a first branch port, a second branch port and a common base port. The photonic integrated circuit may comprise a waveguide polarizer having a first polarizer port and a second polarizer port, and a second coupler having a first branch port, a second branch port and a common base port.

The first branch port of the first coupler may be coupled to the light source through a first waveguide, the second branch port of the first coupler may be coupled to the photodetector through a second waveguide, and the common base port of the first coupler may be coupled to the first polarizer port through a third waveguide. The first branch port of the second coupler coupled to the first connector through a fourth waveguide, the second branch port of the second coupler connected to the second connector through a fifth waveguide, and the common base port of the second coupler coupled to the second polarizer port through a sixth waveguide. The HPIC may further comprise at least one of an isolator, an absorber, a filter and a deflector, disposed proximate to the fifth waveguide, the polarizer, and the sixth waveguide. The first through sixth waveguides may be configured to be single-mode and polarization-maintaining. The HPIC components, formed on a common submount as described herein, may facilitate efficient use of physical space and enhanced transmission and coupling characteristics.

The HPIC may further comprise a fiber coil having a first fiber coil port coupled to the first connector and a second fiber coil port coupled to the second connector, and a phase modulator associated with the fiber coil. The phase modulator may be configured to modulate, based on a modulating signal, light that propagates through the fiber coil. The HPIC, fiber coil and modulator, when configured as described, may form an optic system for use in a FOG.

The HPIC may further comprise a detection/feedback circuit. The detection/feedback circuit may comprise a local oscillator configured to provide a reference signal from which the modulating signal is derived, and a phase sensing detector configured to receive an output signal produced by the photodetector, and produce a rotation measurement signal therefrom. The HPIC, fiber coil, modulator, and detection/feedback circuit may form a FOG.

The HPIC may further comprise an optic wavemeter, formed on the photonic integrated circuit, which uses at least a portion of an optical signal that is (i) derived from the light source and (ii) returned from the fiber coil, and produces a signal that represents an effective interferometric wavelength of the optical signal. The HPIC may further comprise a scale factor correction mechanism, included with the detection/feedback circuit, which corrects a FOG scale factor based on the effective interferometric wavelength of the optical signal. The phase sensing detector may remove the modulating signal from the output signal produced by the photodetector.

The HPIC may further comprise an inline optic isolator disposed in the first waveguide, between the semiconductor-based light source and the first coupler. The first through sixth waveguides may be configured to support only a single spatial mode. The first through sixth waveguides may be configured to be birefringent. The first through sixth waveguides may be configured to support only a single linear polarization mode. The first through sixth waveguides may comprise nitride on glass, although other technologies may also be used. The semiconductor light source is a broadband light source.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The foregoing will be apparent from the following more particular description of example embodiments, as illustrated in the accompanying drawings in which like reference characters refer to the same parts throughout the different views. The drawings are not necessarily to scale, emphasis instead being placed upon illustrating embodiments.

FIG. 5A shows an example embodiment of a PIC waveguide according to the invention.

FIGS. 5B and 5C show a model and associated simulation results of the waveguide depicted in FIG. 5A.

DETAILED DESCRIPTION

A description of example embodiments follows.

The teachings of all patents, published applications and references cited herein are incorporated by reference in their entirety.

Certain interferometric fiber-optic gyroscope (IFOG; also referred to herein as a "FOG") applications need to operate under a particularly tight set of constraints. For example, an IFOG used in an automotive application needs to be operated in wide temperature and humidity ranges for significant lengths of time, while the IFOG failure rate must be at least as low as those of other parts of the vehicle. Further, the IFOG needs to be relatively low-cost and be capable of being mass produced. An IFOG architecture based on a photonic integrated circuit (PIC) may facilitate low manufacture cost and mass production of a high-stable fiber optic gyroscope. A multifunctional photonic integrated circuit may be fabricated based on a silicon substrate, using materials and processes compatible with fabrication of microelectronic circuits.

Figure 1:
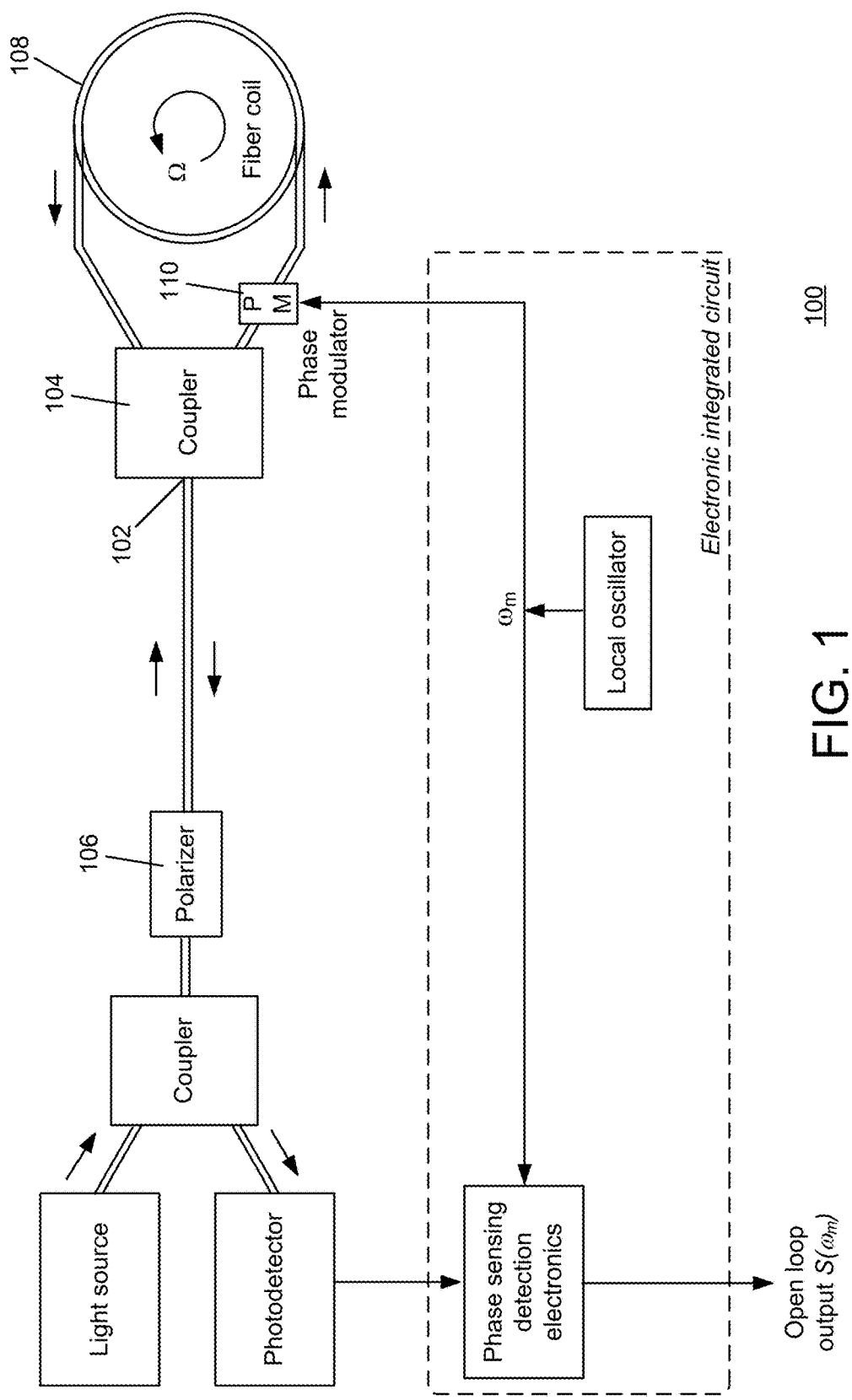
FIG. 1 shows an example prior art open-loop interferometric fiber-optic gyroscope (IFOG).
Figure 2:
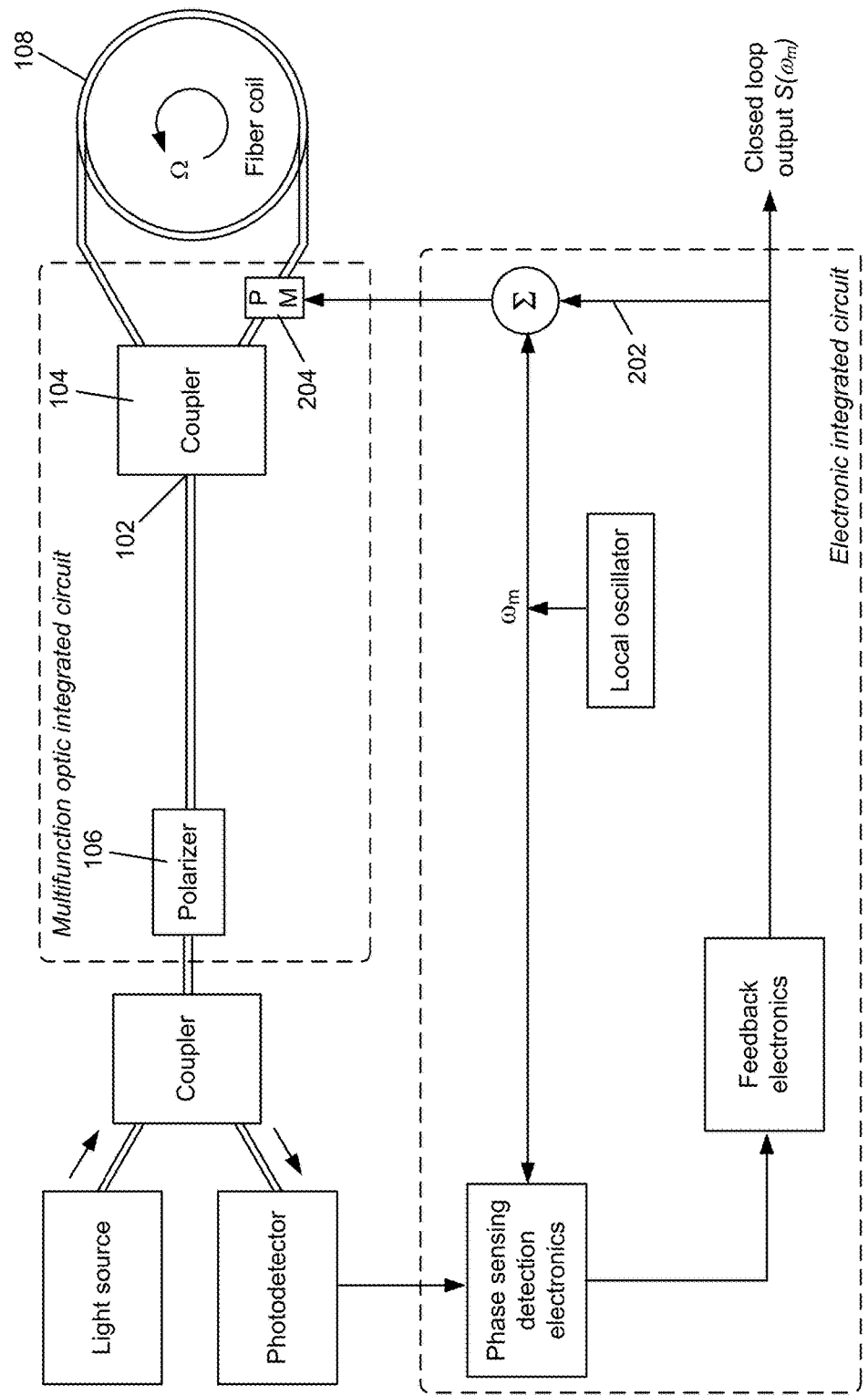
FIG. 2 shows an example prior art closed-loop IFOG.
Figure 3:
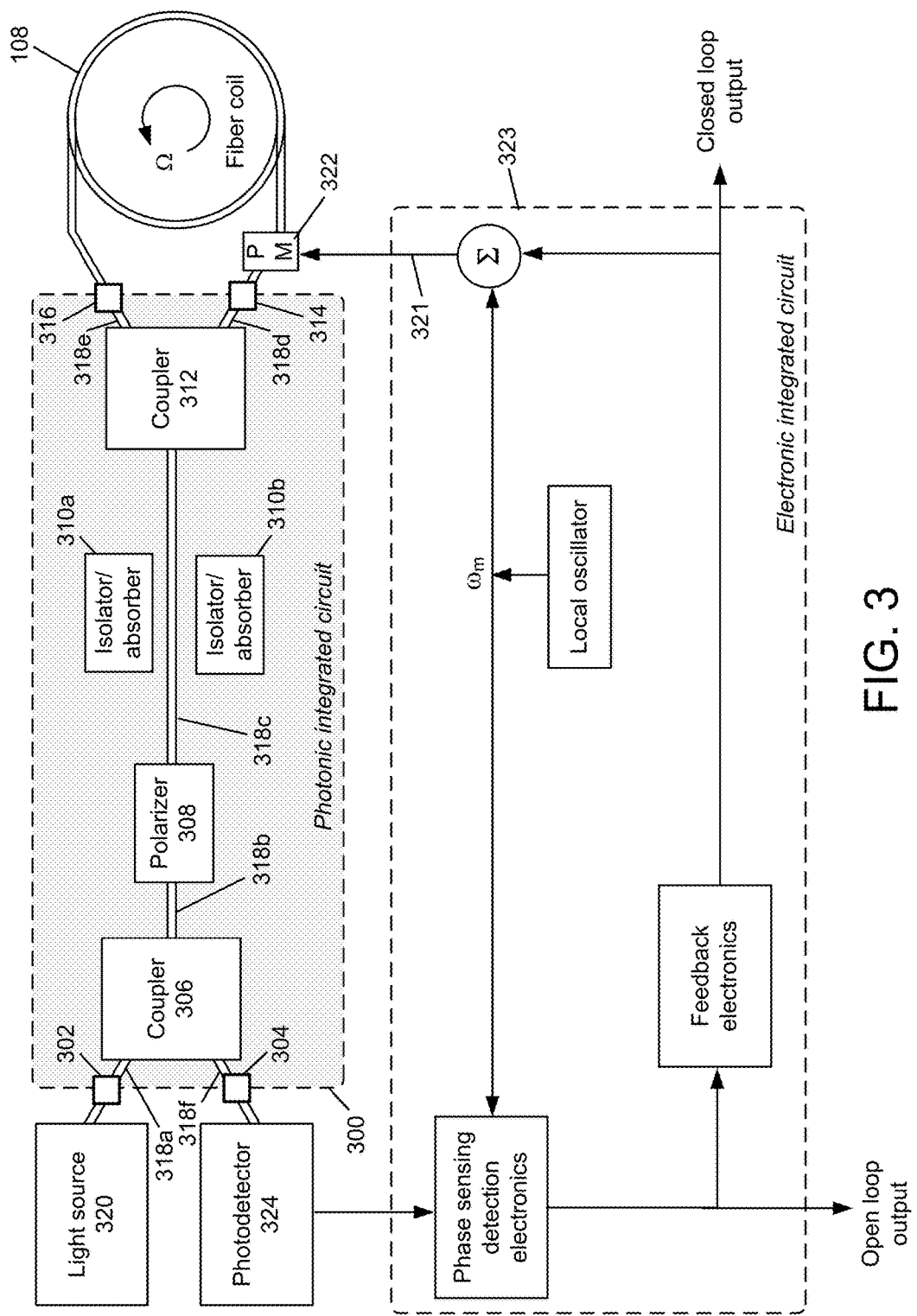
FIG. 3 shows an example embodiment of a photonic integrated circuit (PIC) for use in an IFOG device, according to the invention.

FIG. 3 shows an example embodiment of a photonic integrated circuit (PIC) 300 for use in an IFOG device, according to the invention. The PIC circuit may be fabricated based on a waveguide structure that supports a single spatial and single polarization mode. The PIC circuit layout may comprise a first connector 302, a second connector 304, a first coupler 306 (also referred to herein as a beamsplitter), a light polarizer 308, at least one stray light isolator (or absorber) 310a, 310b, second coupler 312, a third connector 314, and a fourth connector 316. One or more of the couplers 306, 312, the polarizer 308 and the isolator/absorbers 310a, 310b, may be fabricated on a common substrate. The components of the PIC 300 may be connected to one another, as shown in FIG. 3, through waveguide structures 318a-318f, fabricated on the substrate or otherwise disposed on the PIC 300.

A light source 320, connected to the PIC 300 through the first connector 302, radiates continuous light into the PIC 300 through the first connector 302. The path from a light source 320 to the first connector 302 may be a conventional waveguide with a connector at one or both ends. In one embodiment, the light source 320 may be a superluminescent diode (SLD), although other light sources may be used. The radiated light may pass through the connector 302, through the waveguide 318a, through the coupler 306, through the waveguide 318b, through the polarizer 308, through the waveguide 318c, through the coupler 312, through the waveguide 318d and to the third connector 314.

The PIC 300 may be connected to the sensing fiber coil 108 through the third connector 314 and a fourth connector 316. A phase modulator 322 may be incorporated within the fiber coil 108, at one end of the coil, to supply a dynamic bias to the propagating light. The phase modulator 322 may receive a phase modulating control signal 321 from a detection/feedback circuit 323 as shown. Light from the coupler 312 passes through the connector 314, through the phase modulator 322 and into the fiber coil 108. After passing through the turns of the fiber coil 108, return light passes through the fourth connector 316, through the waveguide 318e and back to the second coupler 312. From the second coupler 312, the returning light from the fiber coil 108 passes through the waveguide 318c, through the polarizer 308, through the waveguide 318b, through the first coupler 306, through the waveguide 318f, and to the second connector 304. A photodetector 324 coupled to the second connector 304 receives the return light from the first coupler 306. The photodetector 324 may be directly attached to the second connector 304, or it may be connected through a conventional waveguide with a connector at one or both ends of the conventional waveguide.

Functionally, the light source 320, first coupler 306 and the photodetector 324 form a transceiver. The photodetector 324 detects the optic signal (i.e., the propagating light) returning from the sensor fiber coil 108. The polarizer 308, the stray light isolator/absorber 310a, 310b, the second coupler 312, the phase modulator 322 and the fiber coil 108 together form a Sagnac interferometer.

The first connector 302 is configured to efficiently couple light from the light source 320 to the waveguide 318a. Various technologies may be used to yield the high coupling efficiency.

In one example embodiment, a mode-spot (spot-size) converter may be implemented at the connector 302 to match the mode-field at the end of the PIC waveguide 318a to the mode-field of the waveguide of the light source 320.

In another example, an optical lens may be utilized at the connector 302 to adjust the mode-field size of the light source 320, projected on the end facet of PIC waveguide 318a, for a good mode match. A micro-fabricated structure may be formed to position the light source 320, the PIC 300 and the focusing lens (not shown) in a precise location to couple the light source 320 and the PIC 300 relatively easily and accurately. A microelectromechanical system (MEMS) can be incorporated into the first connector 302 to move the light source 320 and/or the lens to fine-tune the alignment. After the alignment has been properly adjusted, the relative position can be fixed with suitable technique (e.g., bonding or soldering).

The power of the return light from the Sagnac interferometer varies in response to the turn rate of the gyroscope and may be detected by the photodetector 324. The second connector 304 may couple the return signal from the interferometric sensor to the photodetector 324. The output light from the second connector 304 can be directly projected onto the surface of the photodetector 324, given the sensing area of the photodetector 324 is large enough. A reflecting micro-mirror may be used to direct the return light to a desired direction. A multimode fiber may be applied to guide the light to the position of the detector.

The each of the couplers 306, 312 has a pair of branch ports and a common base port. As described herein, the first coupler 306 couples the light from the light source 320 into the Sagnac interferometer through one of two branch ports, and guides the return light to a photodetector 324 through the other branch port. The coupler 306 can be a Y-style junction or an evanescent wave coupled directional coupler. The common base waveguide port of the first coupler 306 is connected to the polarizer 308.

The waveguide polarizer 308 may be implemented by a section of the waveguide (318b and/or 318c) that connects the base waveguide of the first coupler 306 and the second coupler 312. The polarizer 308 has a low propagation loss for the polarized light in the operation polarization direction, but a very high propagation loss on the polarized light in the direction orthogonal to the operational polarization direction. Various approaches may be applied to ensure a large polarization dependence of the propagation loss. If the waveguide used to implement the polarizer 308 has reasonably large birefringence, the TM mode may be more loosely guided than the TE mode.

A waveguide having a series of bends of a small radius may cause the TM mode be highly attenuated, while the TE mode may be attenuated by a negligible amount, which results in an effective waveguide polarizer. Better than 60 dB extinguish ratio with low propagation loss on TM mode is achievable. A waveguide with a cladding having an optimized thickness may also manifest as an effective method to implement the polarizer 308. Since the evanescent tail of the TM mode extends further away from the waveguide core than that of the TE mode, the TM mode can be highly attenuated while the TE mode remains substantially undisturbed. Further, the top of the cladding material may be coated with a layer of material to enhance the attenuation of the TM mode. Examples of such a material may be dielectric materials with a higher refractive index than the cladding material, or dielectric material or metal that is absorptive to the light at the operation wavelength.

A section of curved waveguide may be arranged to connect the two couplers 306, 312 such one end of the curved waveguide forms an angle with respect to the other end of the curved waveguide. This arrangement may prevent the antisymmetrical mode radiation, started at the junctions towards the common base waveguide of the two couplers, from being recoupled into the waveguide. The waveguide polarizer 308 can itself be incorporated into the curved shape to fulfil this purpose and save space.

At least one isolator/absorber 310a, 310b may be used to further reject any nonreciprocal light. In one example embodiment, a patterned layer of optically absorptive material may be deployed alongside the circuit waveguide to implement the isolator/absorber functionality, especially along the waveguide between the two couplers 306, 312. Alternatively, waveguides may be micro-fabricated together with the waveguide connecting the couplers 306, 312, to form a protective waveguide structure. The protective waveguide structure may be fabricated on both sides of, and in proximity to, the waveguide(s) 318b, 318c that connect the two couplers 306, 312. Further, trench arrays may be fabricated, at certain locations along the waveguide(s) 318b, 318c that connect the two couplers 306, 312, to direct the stray light in the vertical direction (with respect to the surface plane of the photonic integrated circuit substrate). The curved waveguide configuration described herein, along with the addition features (such as isolator, or absorber, or filter, or deflector), may serve to minimize the strayed light from being recoupled by other sections of the circuit, and to depress potential spurious signals within the gyroscope due to an erroneous secondary optical pass.

The second coupler 312 divides the guided light from the common base waveguide 318c into two equal waves. The two waveguide branches 318d, 318e of the second coupler 312 are coupled to a third connector 314 and a fourth connector 316. The difference of the optic path of branch waveguide 314 and branch waveguide 316 (i.e., the difference of the effective optic path of the waveguide between the second coupler 312 and the third connector 314, and the effective optic path of the waveguide between the second coupler 312 and the fourth connector 316), may be made larger than the coherence length of the light source 320. In one example embodiment, the optic path difference is larger than three times of the coherence length of the light source 320.

The two connectors 314, 316 at the ends of the waveguide branches 318d, 318e from the second coupler 312, have a micro-structure configured to increase the coupling efficiency to optical fiber. One example of such a micro-structure may be a spot-size convertor that converts the mode-field of the planar waveguide 318d, 318e, to the same mode size of the optic fiber of the sensing coil 108. The end facet of the PIC chip may be cut and polished at an appropriate angle with respect to the waveguide termination. This angle-polished facet may prevent any reflected light from being guided by the waveguide in an opposite direction. To achieve a low-loss connection to a fiber, the fiber tip may be also polished into a corresponding Fresnel angle. Another example of fiber-to-waveguide coupling method is explained in detail by U.S. Patent Application Ser. No. 62/559,307, filed Sep. 15, 2017, the entire contents of which are incorporated by reference herein. A low coupling low, polarization maintaining and self-aligning connection of optical fiber to waveguide of photonic integrated circuit may be achieved by using a side polished or chemical etched D-shape fiber.

The disclosed PIC may operate using short wavelength light, in one embodiment a wavelength of 830 nm. The scale factor of an IFOG, which determines the response sensitivity of the FOG to the rotational rate, is proportional to the optical fiber coil length but is inversely proportional to the operation wavelength. For a given IFOG and associated scale factor, the same scale factor may be held constant with a shorter optical fiber length (smaller coil size) by operating the IFOG at a shorter wavelength. A non-silicon based PIC may be used facilitate shorter wavelength operation of the IFOG device. In one embodiment, a PIC fabricated with silicon nitride on silicon oxide may facilitate 830 nm wavelength operation.

Figure 4:
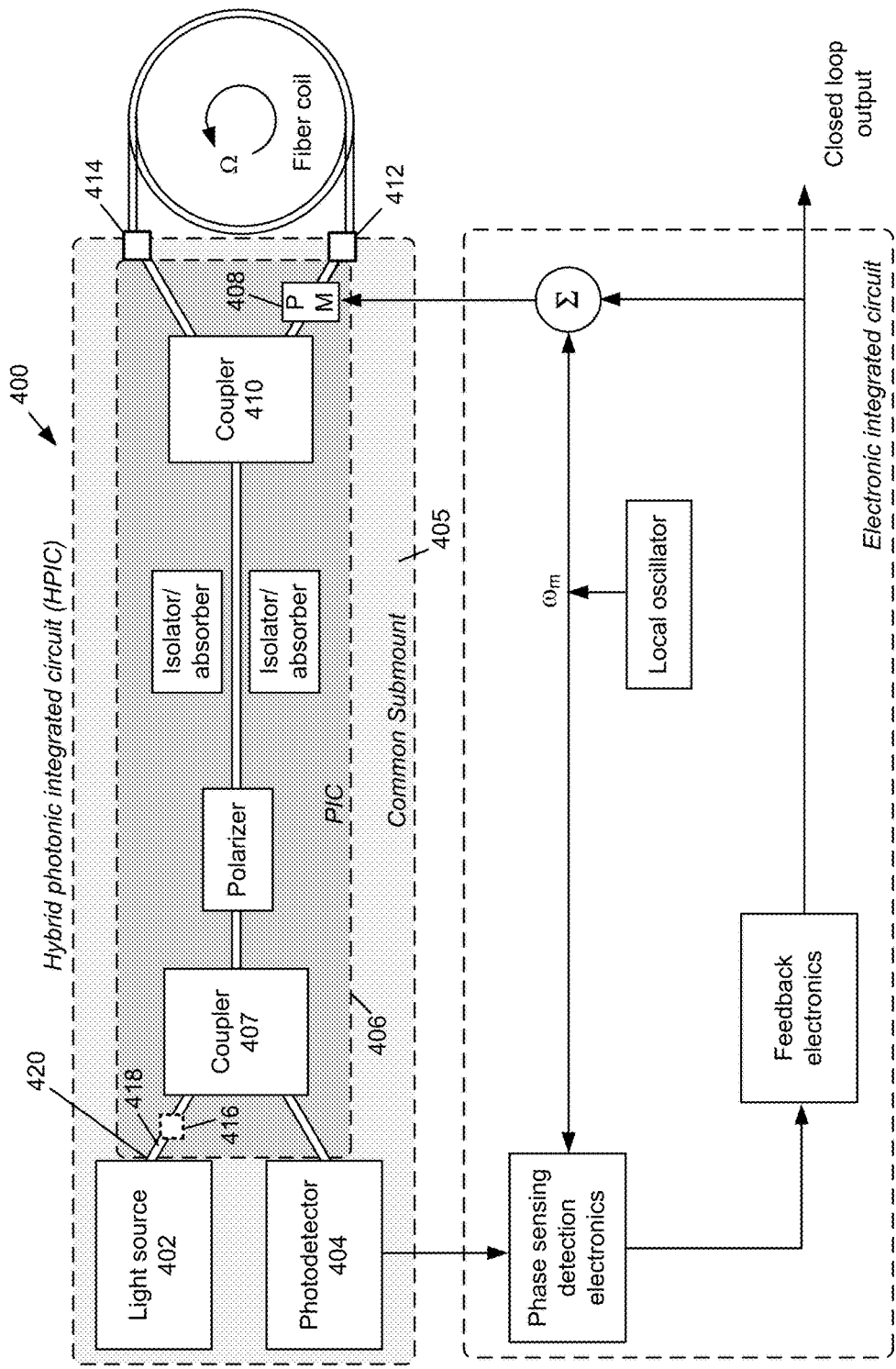
FIG. 4 shows an example embodiment of a hybrid photonic integrated circuit (HPIC) for use in an IFOG device, according to the invention.

An example embodiment of a hybrid photonic integrated circuit (HPIC) for use in an IFOG is shown in the FIG. 4. In the example embodiment of a HPIC 400, both the light source 402 and the photodetector 404 (which are fabricated with semiconductor materials different from the materials of the PIC 406) may be micro-mounted together with the PIC 406 on a common submount 405. The end-fire coupling technique described herein may be employed to couple the light source 402 and the photodetector 404 to the waveguides leading to the branch ports of the first coupler 407. A spot-size convertor may be micro-fabricated on the PIC waveguide(s) leading to the first coupler 407, at the interface to the light source 402 and/or the photodetector 404, to increase the coupling efficiency and ease the alignment tolerance.

In another example embodiment of a HPIC, the light source 402 may be integrated on the top surface of the PIC waveguide through wafer level microfabrication. The broadband emission may be transferred into the PIC waveguide through evanescent wave interactions between the modes of the light source waveguide and the PIC waveguide (see, e.g., "Integrated optical driver for interferometric optical gyroscopes," M. A. TRAN, T. KOMLJENOVIC, J. C. HULME, M J KENNEDY, D. J. BLUMENTHAL AND J. E. BOWERS, Vol. 25, No. 4|20 Feb. 2017|OPTICS EXPRESS p 3826~p 3839).

In another example embodiment, a special SLD device may be fabricated that facilitates SLD-to-waveguide evanescent wave coupling through a flip-chip assembling. This embodiment may achieve a high coupling efficiency with a loose alignment accurate requirement.

In another example embodiment of a HPIC, an inline phase modulator 408 may be incorporated into a PIC circuit 406. In one example embodiment of the inline phase modulator 408, a layer of piezoelectric material, together with appropriate metal electrodes, may be deposited and patterned on the top surface of the top cladding layer, in the section of the waveguide between the second coupler 410 and the first connector 412 and/or the second connector 414. The piezoelectric layer may cause the underneath waveguide material to experience stress when an electric voltage is applied to the piezoelectric material. The stress may change the effective refractive index of the waveguide and dynamically change the phase of the light propagating in the waveguide. In another example of inline phase modulator, a piece of x-cut thin lithium niobate film may be overlaid on the top surface of the core of the PIC waveguide, on the section of the waveguide between the second coupler 410 and the first connector 412 and/or the second connector 414. The top surface of the lithium niobate film needs to be in intimate contact with the top surface of the PIC waveguide. In this way a ridge-type hybrid single-mode waveguide may be built.

The device loss is largely determined by the mode field matching between the hybrid waveguide and the PIC waveguide. In the example embodiment shown in FIG. 5A, the PIC waveguide 500 is composed of a thin strip of silicon nitride core 502 and silicon oxide cladding 504. A hybrid waveguide is formed through overlaying, on the top surface of the silicon nitride core, an x-cut thin lithium niobate film 506 that has formed into it a sharp V-shape at both ends. Simulation results, shown in FIG. 5C (corresponding to the model shown in FIG. 5B), demonstrate that the device coupling efficiency of this embodiment is greater than 90%. When the phase modulator is operated in a push-pull configuration, $V\_\pi=6.0$ V, and residual intensity modulation (RIM) is less than 420 ppm.

In another example embodiment of a HPIC, an inline optic isolator 416 may be configured by overlaying a thin film of magneto-optical (MO) material, such as Ce-substituted yttrium iron garnet (Ce:YIG) on the top surface of the PIC waveguide core in the section of the waveguide 418 between the light source input 420 and the first coupler 407. The top surface of the MO film needs to be in intimate contact with the top surface of the PIC waveguide 418. In this way a ridge-type hybrid single-mode waveguide may be built. In the hybrid waveguide, optical reciprocity is broken by applying a magnetic field across the MO material. Light that is returned from the Sagnac interferometer is prevented from feeding back into the light source 402 by the Faraday effect in the MO material.

Figure 6:
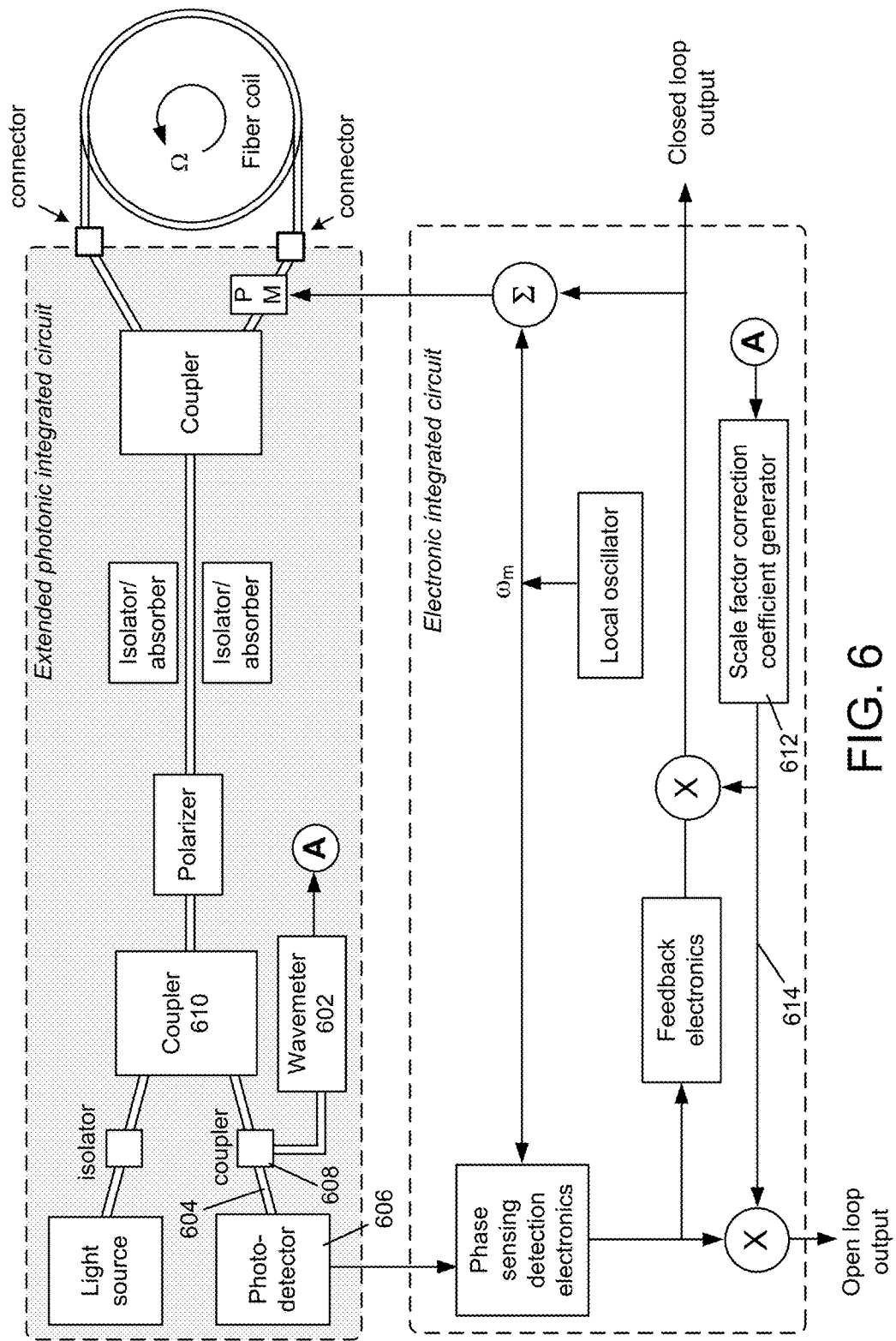
FIG. 6 shows an extended photonic integrated circuit according to the invention.

An example embodiment of an extended photonic integrated circuit (EPIC) for a FOG is shown in the FIG. 6. With the EPIC, a wavemeter can be incorporated and fabricated together with the main PIC circuit. The EPIC fabrication is fully compatible with the complementary metal oxide semiconductor (CMOS) processes, and also with the fabrication of the main PIC circuits. A wavemeter enables the measurement and monitoring of the effective interferometric wavelength being utilized in the rotation sensing, and the correction, in real-time, of the scale factor of the angular speed measurement caused by wavelength shift and instability.

To incorporate the wavemeter 602, a fraction of the return signal from the Sagnac interferometer can be redirected from the waveguide 604 that leads to the photodetector 606. An asymmetric Y-junction or a non-balanced direction coupler 608 can be placed in the waveguide 604 between the first coupler 610 and the photodetector 606, to redirect a portion of the return signal. The redirected signal can be used as the input of the wavemeter 602, and the output of the wavemeter 602 may be used by a scale factor correction coefficient generator 612 to generate a scale factor correction coefficient 614 to be used, as shown, to correct the scale factor. Further detail and example embodiments regarding the wavemeter and scale factor correction may be found in U.S. patent application Ser. No. 15/877,110, filed Jan. 22, 2018, the entire contents of which are hereby incorporated by reference herein.

Although described herein with respect to the example embodiment of the EPIC, it should be understood that the wavemeter and scale factor correction components may also be incorporated in the PIC and HPIC embodiments described herein.

While example embodiments have been particularly shown and described, it will be understood by those skilled in the art that various changes in form and details may be made therein without departing from the scope of the embodiments encompassed by the appended claims.

What is claimed is:

1. A photonic integrated circuit (PIC) for use in a fiber optic gyroscope (FOG), comprising:
   a first connector configured to be connected to a light source;
   a second connector configured to be connected to a photodetector;
   a third connector configured to be connected to a first port of a fiber coil;
   a fourth connector configured to be connected to a second port of the fiber coil;
   a first coupler having a first branch port, a second branch port and a common base port;
   a waveguide polarizer having a first polarizer port and a second polarizer port;
   a second coupler having a first branch port, a second branch port and a common base port;
   the first branch port of the first coupler coupled to the first connector through a first waveguide, the second branch port of the first coupler coupled to the second connector through a second waveguide, and the common base port of the first coupler coupled to the first polarizer port through a third waveguide;
   the first branch port of the second coupler coupled to the third connector through a fourth waveguide, the second branch port of the second coupler connected to the fourth connector through a fifth waveguide, and the common base port of the second coupler coupled to the second polarizer port through a sixth waveguide;
   at least one of an isolator, an absorber, a filter, and a deflector disposed proximate to the one or more of the fifth waveguide, the polarizer, and the sixth waveguide; and
   the first through sixth waveguides are optic waveguides configured to be single-mode and polarization-maintaining.

2. The PIC of claim 1, further comprising:
   a light source coupled to the first connector;
   a photodetector coupled to the second connector;
   a fiber coil having a first fiber coil port coupled to the third connector and a second fiber coil port coupled to the fourth connector; and
   a phase modulator associated with the fiber coil, the phase modulator configured to modulate, based on a modulating signal, light that propagates through the fiber coil,
   thereby forming an optic system for use in a FOG.

3. The PIC of claim 2, further comprising:
   a detection/feedback circuit, comprising:
      a local oscillator configured to provide a reference signal from which the modulating signal is derived; and
      a phase sensing detector configured to receive an output from the photodetector and produce a rotation measurement signal therefrom,
   thereby forming the FOG.

4. The PIC of claim 1, wherein the first through sixth waveguides are configured to support only a single spatial mode.

5. The PIC of claim 1, wherein the first through sixth waveguides are configured to be birefringent.

6. The PIC of claim 5, wherein the first through sixth waveguides are configured to support only a single linear polarization mode.

7. The PIC of claim 1, wherein the light source is a broadband, semiconductor-based light source.

8. The PIC of claim 1, further comprising an inline optic isolator disposed in the first waveguide, between the first connector and the first coupler.

9. An extended photonic integrated circuit (EPIC) for use in a fiber optic gyroscope (FOG), comprising:
   a light source;
   a photodetector;
   a first connector configured to be connected to a first port of a fiber coil;
   a second connector configured to be connected to a second port of the fiber coil;
   a first coupler having a first branch port, a second branch port and a common base port;
   a waveguide polarizer having a first polarizer port and a second polarizer port;
   a second coupler having a first branch port, a second branch port and a common base port;
   the first branch port of the first coupler coupled to the light source through a first waveguide, the second branch port of the first coupler coupled to the photodetector through a second waveguide, and the common base port of the first coupler coupled to the first polarizer port through a third waveguide;
   the first branch port of the second coupler coupled to the first connector through a fourth waveguide, the second branch port of the second coupler connected to the second connector through a fifth waveguide, and the common base port of the second coupler coupled to the second polarizer port through a sixth waveguide;
   at least one of an isolator, an absorber, a filter and a deflector, disposed proximate to the fifth waveguide, the polarizer, and the sixth waveguide;
   an optic wavemeter that uses at least a portion of an optical signal that is (i) derived from the light source and (ii) returned from the fiber coil, and produces a signal that represents an effective interferometric wavelength of the optical signal;
   the first through sixth waveguides configured to be single-mode and polarization-maintaining.

10. The EPIC of claim 9, further comprising:
   a fiber coil having a first fiber coil port coupled to the first connector and a second fiber coil port coupled to the second connector; and
   a phase modulator associated with the fiber coil, the phase modulator configured to modulate, based on a modulating signal, light that propagates through the fiber coil,
   thereby forming an optic system for use in the FOG.

11. The EPIC of claim 10, further comprising:
   a detection/feedback circuit module, comprising:
      a local oscillator configured to provide a reference signal from which the modulating signal is derived;

a phase sensing detector configured to receive an output from the photodetector and produce a rotation measurement signal therefrom; and a scale factor correction mechanism that corrects a FOG scale factor based on the effective interferometric wavelength of the optical signal, thereby forming the FOG.

12. The EPIC of claim 9, wherein the first through sixth waveguides are configured to support only a single spatial mode.

13. The EPIC of claim 9, wherein the first through sixth waveguides are configured to be birefringent.

14. The PIC of claim 13, wherein the first through sixth waveguides are configured to support only a single linear polarization mode.

15. The EPIC of claim 11, wherein the phase sensing detector removes a modulation frequency component from the output of the photodetector to produce the rotation measurement signal.

16. The EPIC of claim 9, wherein the light source is a broadband, semiconductor-based light source.

17. The EPIC of claim 9, further comprising an inline optic isolator disposed in the first waveguide, between the light source and the first coupler.

18. An hybrid photonic integrated circuit (HPIC) for use in a fiber optic gyroscope (FOG), comprising:
a submount;
a semiconductor-based light source fixedly attached to the submount;
a photodetector fixedly attached to the submount;
a first connector, fixedly attached to the submount, the first connector configured to be connected to a first port of a fiber coil;
a second connector, fixedly attached to the submount, the second connector configured to be connected to a second port of the fiber coil;
a photonic integrated circuit, fixedly attached to the submount, comprising:
a first coupler having a first branch port, a second branch port and a common base port;
a waveguide polarizer having a first polarizer port and a second polarizer port;
a second coupler having a first branch port, a second branch port and a common base port;
the first branch port of the first coupler coupled to the light source through a first waveguide, the second branch port of the first coupler coupled to the photodetector through a second waveguide, and the common base port of the first coupler coupled to the first polarizer port through a third waveguide;
the first branch port of the second coupler coupled to the first connector through a fourth waveguide, the second branch port of the second coupler connected to the second connector through a fifth waveguide, and the common base port of the second coupler coupled to the second polarizer port through a sixth waveguide; and at least one of an isolator, an absorber, a filter and a deflector, disposed proximate to the fifth waveguide, the polarizer, and the sixth waveguide;

the first through sixth waveguides configured to be single-mode and polarization-maintaining.

19. The HPIC of claim 18, further comprising:
a fiber coil having a first fiber coil port coupled to the first connector and a second fiber coil port coupled to the second connector; and
a phase modulator associated with the fiber coil, the phase modulator configured to modulate, based on a modulating signal, light that propagates through the fiber coil, thereby forming an optic system for use in a FOG.

20. The HPIC of claim 19, further comprising:
a detection/feedback circuit, comprising:
a local oscillator configured to provide a reference signal from which the modulating signal is derived; and
a phase sensing detector configured to receive an output signal produced by the photodetector, and produce a rotation measurement signal therefrom, thereby forming the FOG.

21. The HPIC of claim 20, further comprising:
an optic wavemeter, formed on the photonic integrated circuit, which uses at least a portion of an optical signal that is (i) derived from the light source and (ii) returned from the fiber coil, and produces a signal that represents an effective interferometric wavelength of the optical signal; and
a scale factor correction mechanism, included with the detection/feedback circuit, that corrects a FOG scale factor based on the effective interferometric wavelength of the optical signal.

22. The HPIC of claim 21, wherein the phase sensing detector removes the modulating signal from the output signal produced by the photodetector.

23. The HPIC of claim 18, further comprising an inline optic isolator disposed in the first waveguide, between the semiconductor-based light source and the first coupler.

24. The HPIC of claim 18, wherein the first through sixth waveguides are configured to support only a single spatial mode.

25. The HPIC of claim 18, wherein the first through sixth waveguides are configured to be birefringent.

26. The HPIC of claim 25, wherein the first through sixth waveguides are configured to support only a single linear polarization mode.

27. The HPIC of claim 18, wherein the semiconductor light source is a broadband light source.

* * * * *